United States Patent
Zhu

(10) Patent No.: US 10,053,385 B1
(45) Date of Patent: Aug. 21, 2018

(54) DEVICE FOR SEPARATING WATER FROM SLUDGE

(71) Applicant: Ziyu Zhu, Guangzhou (CN)

(72) Inventor: Ziyu Zhu, Guangzhou (CN)

( * ) Notice: Subject to any disclaimer, the term of this patent is extended or adjusted under 35 U.S.C. 154(b) by 0 days.

(21) Appl. No.: 15/973,731

(22) Filed: May 8, 2018

(30) Foreign Application Priority Data

Apr. 23, 2018 (CN) .......................... 2018 1 0367279

(51) Int. Cl.
*C02F 11/12* (2006.01)
*B01D 21/24* (2006.01)
*C02F 11/16* (2006.01)

(52) U.S. Cl.
CPC ............ *C02F 11/12* (2013.01); *C02F 11/121* (2013.01); *C02F 11/122* (2013.01); *B01D 21/2461* (2013.01); *C02F 11/125* (2013.01); *C02F 11/16* (2013.01); *C02F 2201/008* (2013.01); *C02F 2303/26* (2013.01); *F26B 2200/18* (2013.01)

(58) Field of Classification Search
CPC ....... C02F 11/12; C02F 11/121; C02F 11/122; C02F 11/125; C02F 11/16; C02F 2201/008; C02F 2303/26; B01D 21/2461; F26B 2200/18
See application file for complete search history.

(56) References Cited

U.S. PATENT DOCUMENTS

| 4,244,287 A * | 1/1981 | Maffet | B01D 29/25 100/37 |
| 5,186,840 A * | 2/1993 | Christy | B01F 15/00253 210/709 |
| 2016/0115066 A1* | 4/2016 | Yamashita | B01D 21/2488 210/806 |

FOREIGN PATENT DOCUMENTS

WO    WO-2010044549 A2 *  4/2010  ............. B30B 9/125

* cited by examiner

*Primary Examiner* — Terry K Cecil

(57) ABSTRACT

A device for separating water from sludge comprising a processing box, wherein a feeding cylinder is disposed above the processing box, and the feeding cylinder is fixedly connected to the processing box through a plurality of connecting rods; a rotating rod is rotationally connected into the feeding cylinder; a first rotating motor is fixedly connected to one side of the feeding cylinder; the output end of the first rotating motor penetrates through the side wall of the feeding cylinder, and is fixedly connected to the rotating rod; a spiral blade is fixedly sleeved with the rotating rod, and the outer side of the spiral blade is matched with the inner side wall of the feeding cylinder.

8 Claims, 3 Drawing Sheets

DEVICE FOR SEPARATING WATER FROM SLUDGE

TECHNICAL FIELD OF THE INVENTION

The present invention relates to the technical field of sludge processing, and more particularly, to a device for separating water from sludge.

BACKGROUND OF THE INVENTION

During the construction of a city watercourse, a large amount of sludge needs to be processed before being transported away and used for other purposes. As sludge is mostly water with a lesser amount of solid material, it is very inconvenient to transport due to its predominately liquefied state. In order to achieve an effective separation between the water and the sludge, various separation devices are in the market. However, these traditional separation devices fail to achieve this goal due to their unreasonable structures. Thus, it's urgent for those skilled in this field to develop a novel device capable of effectively separating water from sludge.

SUMMARY OF THE INVENTION

The purpose of the present invention is to solve the shortcomings (e.g., failing to achieving an effective separation, or the separated water and the sludge not being properly processed) in the prior art by providing a device for separating the water from the sludge, which has a compact structure and can be conveniently operated. According to the present invention, the water and the sludge can be separately processed after being separated, achieving an ideal separation effect.

The present invention adopts the following technical solution:

A device for separating the water from the sludge comprising a processing box, wherein a feeding cylinder is disposed above the processing box, and the feeding cylinder is fixedly connected to the processing box through a plurality of connecting rods; a rotating rod is rotationally connected into the feeding cylinder; a first rotating motor is fixedly connected to one side of the feeding cylinder; the output end of the first rotating motor penetrates through the side wall of the feeding cylinder, and is fixedly connected to the rotating rod; a spiral blade is fixedly sleeved with the rotating rod, and the outer side of the spiral blade is matched with the inner side wall of the feeding cylinder; a feeding hopper is disposed at the top of the feeding cylinder, and a feeding mechanism corresponding to the feeding hopper is disposed on one side of the processing box; the feeding hopper is rotationally connected to a first rotating shaft and a second rotating shaft; the first rotating shaft and the second rotating shaft are respectively sleeved with a crushing wheel; one end of the first rotating shaft and one end of the second rotating shaft penetrate through the feeding hopper, and are respectively sleeved with a gear; the two gears are engaged; one side of the feeding hopper is fixedly connected to a second rotating motor; the output end of the second rotating motor penetrates through the feeding hopper, and is fixedly connected to the first rotating shaft.

In another preferred embodiment, the processing box is divided into a sludge cavity and a water purification cavity through a partition plate. One side of the feeding cylinder is provided with a discharge hole, and a pipeline is fixedly connected in the discharge hole. The lower end of the pipeline penetrates through the side wall of the sludge cavity, and extends into the sludge cavity. A hydraulic cylinder is fixedly connected to the top of the sludge cavity, and the output end of the hydraulic cylinder is fixedly connected to a hydraulic rod. The lower end of the hydraulic rod is fixedly connected to a squeezing plate, and the bottom of the squeezing plate is fixedly connected to a plurality of cutting blades that are arranged at equal intervals. A bearing plate is disposed underneath the squeezing plate, and the two ends of the bearing plate are respectively fixed to the inner side walls of the partition plate and the sludge cavity. The side wall of the partition plate is fixedly connected to an electric telescopic rod, and the output end of the electric telescopic rod is fixedly connected to a push rod. The push plate and the bearing plate are in a sliding connection. A heating pipe is disposed underneath the bearing plate, and the heating pipe is fixedly connected to the inner walls of the partition plate and the sludge cavity. A water through-hole is formed in the bottom of the feeding cylinder.

In another preferred embodiment, a liquid inlet funnel corresponding to the water through-hole is fixedly connected to the top of the water purification cavity. One side of the liquid inlet funnel penetrates through the top of the water purification cavity and extends inwards, and a porous plate is fixedly connected in the water purification cavity. A filter screen is placed on the porous plate, and one end of the filter screen that is far away from the partition plate penetrates through the side wall of the purification cavity and extends outwards. A support ring is fixedly connected to the outer wall of the purification cavity, and the support ring is in threaded connection with a threaded rod. The lower end of the threaded rod penetrates through the filter screen, and is in threaded connection with the filter screen. A moving mechanism is disposed at the bottom of the processing box.

In another preferred embodiment, the moving mechanism comprises a fixing block that is fixedly connected to the bottom of the processing box. A rolling wheel is disposed on one side of the fixing block that is far away from the processing box. A rotating groove corresponding to the rolling wheel is formed in the fixing block. The rolling wheel is rotationally connected to the inner side wall of the rotating groove through a fixing rod.

In another preferred embodiment, the feeding mechanism comprises a sludge pump that is fixedly connected to the side wall of the processing box. The input end of the sludge pump is fixedly connected to a sludge pipeline, and the output end of the sludge pump is fixedly connected to a communicating pipe. One end of the communicating pipe that is far away from the sludge pump extends towards the upper end of the feed hopper. A sleeve ring is fixedly connected to the communicating pipe. A connecting rod is fixedly connected to the processing box, and the connecting rod is connected to the sleeve ring through a telescopic bar.

In another preferred embodiment, a liquid outlet valve is disposed at the bottom of the water purification cavity.

In another preferred embodiment, a discharge pipe is fixedly connected to the side wall of the sludge cavity. The discharge pipe is in threaded connection with a discharge valve.

In another preferred embodiment, an exhaust fan is fixedly connected to the top of the processing box, and the input end of the exhaust fan penetrates through the top of the processing box, and extends to the interior of the sludge cavity. A heat dissipation hole corresponding to the exhaust fan is formed in the top of the sludge cavity.

Compared with the prior art, the present invention has the following advantages:

Through the feeding mechanism of the present invention, the sludge pipeline can be conveniently inserted into the watercourse, thereby easily guiding the sludge and the water into the feeding hopper. Thus, the sludge in the watercourse can be effectively processed, avoiding the manual retrieval of sludge out of the watercourse, which is cheaper and more efficient. Additionally, the sludge and the impurities (e.g., tree branches) entered into the feeding hopper can be thoroughly crushed by the two crushing wheels, greatly facilitating the post-processing. The sludge and the water can be effectively separated into the sludge cavity and the purification cavity, achieving an ideal separation effect. Furthermore, the spiral blades in the feeding cylinder can help transfer the sludge. During the rotating process of the spiral blades, the sludge and the water can be further separated. Under the action of the heating pipe, the water in the sludge can evaporate faster, and the dried sludge can be easily processed. Through the interaction between the hydraulic cylinder and the hydraulic rod, the sludge can be conveniently squeezed by the squeezing plate and cut by the cutting blades. The block-shaped sludge can be conveniently processed. Moreover, the electric telescopic rod and the push plate allow the sludge blocks to be pushed out from the discharge pipe. Furthermore, the filter screen disposed in the purification cavity can be easily replaced, enabling the impurities in the water to be thoroughly filtered. Thus, the water quality can be significantly improved. The exhaust fan can accelerate the air circulation in the sludge cavity so that the water loss speed can be higher.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

Marking Instructions of the Drawings:
1 Processing Box, 2 Feeding Cylinder, 3 Connecting Rod, 4 The First Rotating Motor, 5 Rotating Rod, 6 Spiral Blade 7 Feeding Hopper, 8 The First Rotating Shaft, 9 The Second Rotating Shaft, 10 Crushing Wheel, 11 Gear, 12 Filter Screen, 13 The Second Rotating Motor, 14 Pipeline, 15 Partition Plate, 16 Hydraulic Cylinder, 17 Hydraulic Rod, 18 Squeezing Plate, 19 Cutting Blade, 20 Bearing Plate, 21 Fixing Block, 22 Rolling Wheel, 23 Porous Plate, 24 Threaded Rod, 25 Supporting Ring, 26 Sludge Pipeline, 27 Sludge Pump, 28 Communicating Pipe, 29 Connecting Rod, 30 Sleeve Ring, 31 Exhaust Fan, 32 Liquid Inlet Funnel, 33 Discharge Pipe, 34 Heating Pipe, 35 Liquid Outlet Valve, 36 Push Plate, 37 Electric Telescopic Rod, 38 Sludge Cavity, 39 Purification Cavity, 40 Rotating Groove, 41 Fixing Rod, 42 Telescopic Bar, 43 Discharge Valve

DETAILED DESCRIPTION OF THE INVENTION

Drawings and detailed embodiments are combined hereinafter to elaborate the technical principles of the present invention.

Figure 1:
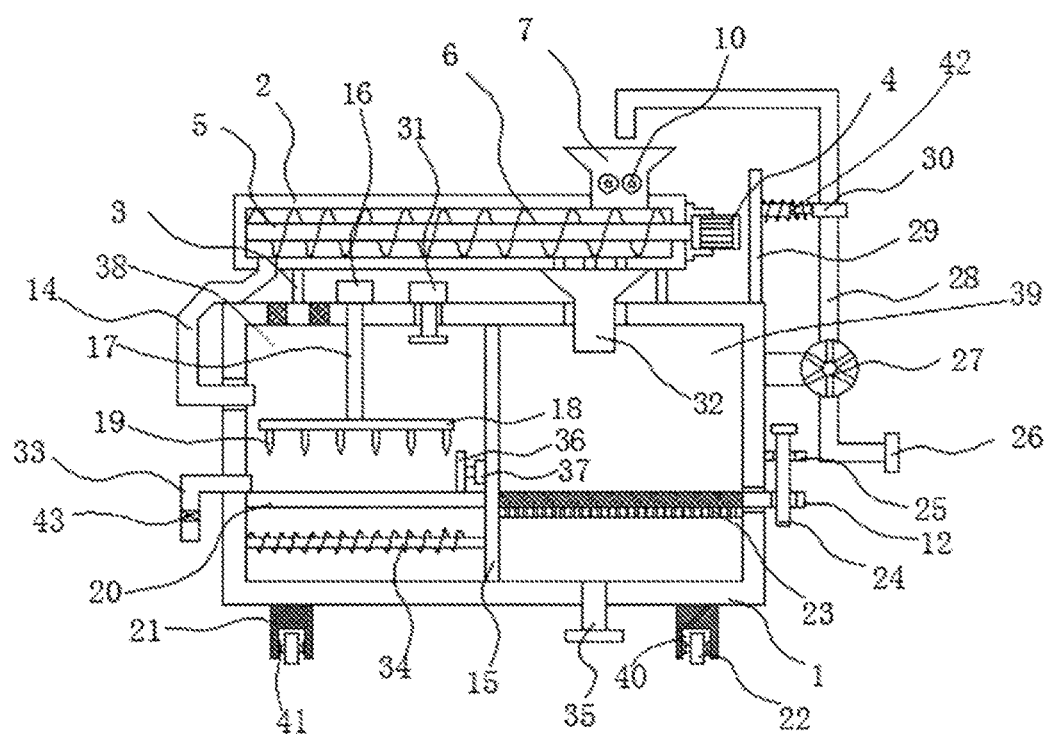
FIG. 1 is a structural diagram of the present invention.
Figure 2:
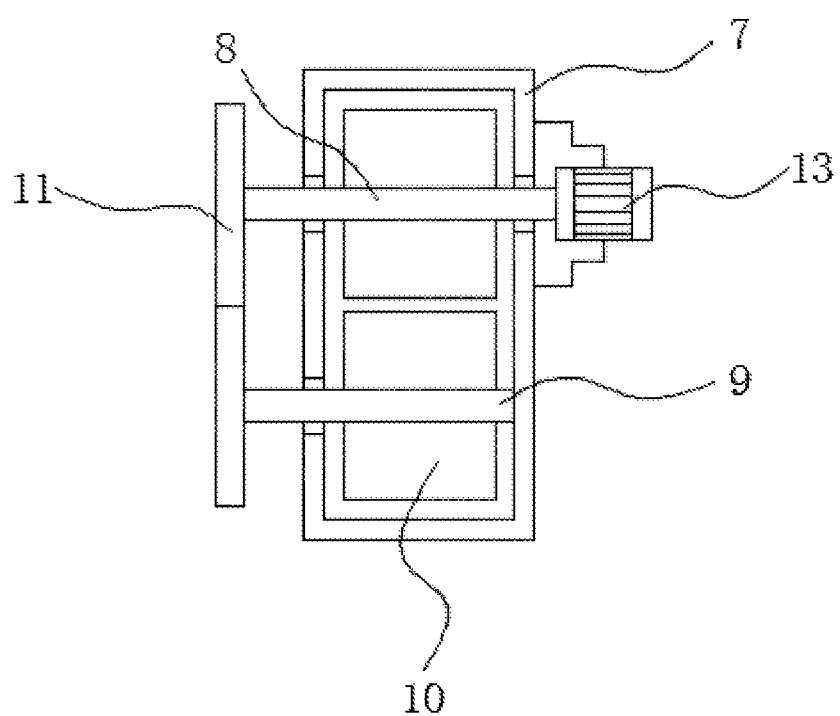
FIG. 2 is a partial top view of the feeding hopper of the present invention.
Figure 3:
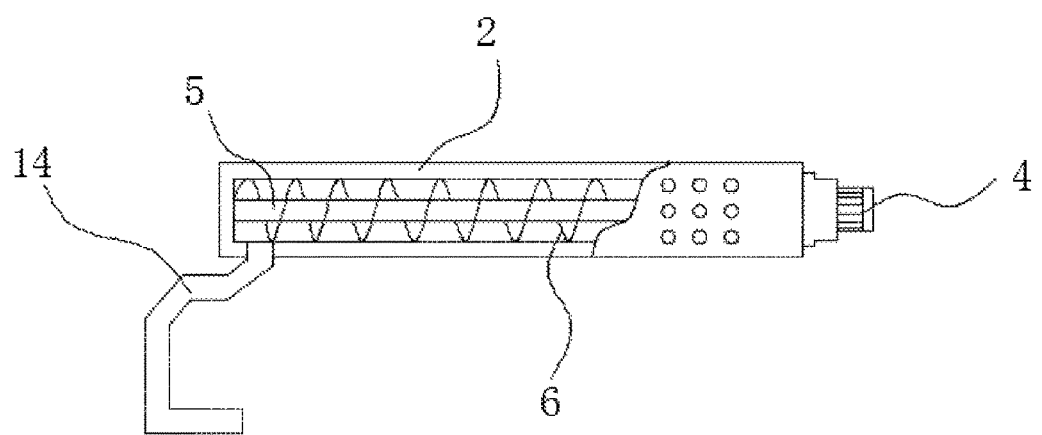
FIG. 3 is a schematic diagram illustrating a part of the external structure of the feeding hopper of the present invention.

As shown in FIGS. 1-3, a device for separating the water from the sludge comprises a processing box 1, wherein an exhaust fan 31 is fixedly connected to the top of the processing box 1, and the input end of the exhaust fan 31 penetrates through the top of the processing box 1, and extends to the interior of a sludge cavity 38. A heat dissipation hole corresponding to the exhaust fan 31 is formed in the top of the sludge cavity 38. According to the exhaust fan 31, the air circulation in the sludge cavity 38 can be accelerated, making the water loss speed of the sludge become higher. A feeding cylinder 2 is disposed above the processing box 1, and the feeding cylinder 2 is fixedly connected to the processing box 1 through a plurality of connecting rods 3. A rotating rod 5 is rotationally connected into the feeding cylinder 2. A first rotating motor 4 is fixedly connected to one side of the feeding cylinder 2. The output end of the first rotating motor 4 penetrates through the side wall of the feeding cylinder 2, and is fixedly connected to the rotating rod 5. A spiral blade 6 is fixedly sleeved with the rotating rod 5, and the outer side of the spiral blade 6 is matched with the inner side wall of the feeding cylinder 2. A feeding hopper 7 is disposed at the top of the feeding cylinder 2, and a feeding mechanism corresponding to the feeding hopper 7 is disposed on one side of the processing box 1. The feeding mechanism comprises a sludge pump 27 that is fixedly connected to the side wall of the processing box 1. The input end of the sludge pump 27 is fixedly connected to a sludge pipeline 26, and the output end of the sludge pump 27 is fixedly connected to a communicating pipe 28. One end of the communicating pipe 28 that is far away from the sludge pump 27 extends towards the upper end of the feed hopper 7. A sleeve ring 30 is fixedly connected to the communicating pipe 28. A connecting rod 29 is fixedly connected to the processing box 1, and the connecting rod 29 is connected to the sleeve ring 30 through a telescopic bar 42. Through the feeding mechanism, the sludge pipeline 26 can be conveniently inserted into the watercourse. After the sludge and the water are guided into the feeding hopper 7, the sludge in the watercourse can be easily processed. Therefore, it's unnecessary to manually get the sludge out from the watercourse, making the process cheaper and more efficient. The feeding hopper 7 is rotationally connected to a first rotating shaft 8 and a second rotating shaft 9. The first rotating shaft 8 and the second rotating shaft 9 are respectively sleeved with a crushing wheel 10. One end of the first rotating shaft 8 and one end of the second rotating shaft 9 penetrate through the feeding hopper 7, and are respectively sleeved with a gear 11. The two gears 11 are engaged. One side of the feeding hopper 7 is fixedly connected to a second rotating motor 13. The output end of the second rotating motor 13 penetrates through the feeding hopper 7, and is fixedly connected to the first rotating shaft 8. The processing box 1 is divided into a sludge cavity 38 and a water purification cavity 39 through a partition plate 15. A liquid outlet valve 35 is disposed at the bottom of the water purification cavity 39, and a discharge pipe 33 is fixedly connected to the side wall of the sludge cavity 38. The discharge pipe 33 is in threaded connection with a discharge valve 43, thereby allowing the sludge to be conveniently discharged. One side of the feeding cylinder 2 is provided with a discharge hole, and a pipeline 14 is fixedly connected in the discharge hole. The lower end of the pipeline 14 penetrates through the side wall of the sludge cavity 38, and extends into the sludge cavity 38. A hydraulic cylinder 16 is fixedly connected to the top of the sludge cavity 38, and the output end of the hydraulic cylinder 16 is fixedly connected to a hydraulic rod 17. The lower end of the hydraulic rod 17 is fixedly connected to a squeezing plate 18, and the bottom of the squeezing plate 18 is fixedly connected to a plurality of cutting blades 19 that are arranged at equal intervals. A bearing plate 20 is disposed underneath the squeezing plate 18, and the two ends of the bearing plate 20 are respectively fixed to the inner side walls of the partition plate 15 and the sludge cavity 38. The side wall of the partition plate 15 is fixedly connected to an electric telescopic rod 37, and the output end of the electric telescopic rod 37 is fixedly connected to a push rod 36. The push plate 36 and the bearing plate 20 are in a sliding connection. A heating pipe 34 is disposed underneath the bearing plate 20, and the heating pipe 34 is fixedly connected to the inner walls of the partition plate 15 and the sludge cavity 38. A water through-hole is formed in the bottom of the feeding cylinder 2, and a liquid inlet funnel 32 corresponding to the water through-hole is fixedly connected to the top of the water purification cavity 39. One side of the liquid inlet funnel 32 penetrates through the top of the water purification cavity 39 and extends inwards, and a porous plate 23 is fixedly connected in the water purification cavity 39. A filter screen 12 is placed on the porous plate 23, and one end of the filter screen 12 that is far away from the partition plate 15 penetrates through the side wall of the purification cavity 39 and extends outwards. A support ring 25 is fixedly connected to the outer wall of the purification cavity 39, and the support ring 25 is in threaded connection with a threaded rod 24. The lower end of the threaded rod 24 penetrates through the filter screen 12, and is in threaded connection with the filter screen so that it can be fixed. A moving mechanism is disposed at the bottom of the processing box 1, and the moving mechanism comprises a fixing block 21 that is fixedly connected to the bottom of the processing box 1. A rolling wheel 22 is disposed on one side of the fixing block 21 that is far away from the processing box 1. A rotating groove 40 corresponding to the rolling wheel 22 is formed in the fixing block 21. The rolling wheel 22 is rotationally connected to the inner side wall of the rotating groove 40 through a fixing rod 41, thereby enabling the device to be conveniently moved.

The operating principle of the present invention is the following:

When initiating the hydraulic cylinder 16, the hydraulic rod 17 is propelled to move upwards. As a result, the squeezing plate 18 is propelled to move upwards, and is positioned above the pipeline 14. After the sludge pipeline 26 is placed into the river that needs to be cleaned, the sludge pump 27, the first rotating motor 4, the heating pipe 34 and the exhaust fan 31 are initiated. The sludge pump 27 pumps the sludge into the feeding hopper 7, and the crushing wheel 10 crushes the sludge and the impurities. After the crushed sludge and the impurities enter into the feeding hopper 2, the water in the sludge flows into the purification cavity 39 through the water through-hole in the feeding cylinder 2, and is filtered by the filter screen 12. The filtered water is discharged through the liquid outlet valve 35, and can used for other purposes. Under the action of the spiral blade 6, the sludge and the impurities become finer, and are transferred into the sludge cavity 38 through the pipeline 14. Subsequently, under the action of the heating pipe 34 and the exhaust fan 31, the water loss speed in the sludge in the sludge cavity 38 becomes higher. When the sludge cakes, the hydraulic cylinder 16 is initiated, propelling the hydraulic rod 17 to move downwards. At this point, the caked sludge is squeezed and shaped by the squeezing plate 18. After the sludge is cut by the cutting blades 19, the squeezing plate 18 can be adjusted to move upwards. Subsequently, the electric telescopic rod 37 is initiated, enabling the sludge in the sludge cavity 38 to be discharged through the discharge pipe 33. Thus, the whole process is completed. According to the present invention, the sludge can be rapidly processed and transported. As the sludge is crushed and cut by the present invention, the sludge discharged from the discharge pipe 33 becomes powder, which can be used for many purposes (e.g., fertilizer).

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A device for separating the water from the sludge, comprising:

a processing box, wherein a feeding cylinder is disposed above the processing box, and the feeding cylinder is fixedly connected to the processing box through a plurality of connecting rods, wherein a rotating rod is rotationally connected into the feeding cylinder, wherein a first rotating motor is fixedly connected to one side of the feeding cylinder, wherein an output end of the first rotating motor penetrates through the side wall of the feeding cylinder, and is fixedly connected to the rotating rod, wherein a spiral blade is fixedly sleeved with the rotating rod, and the outer side of the spiral blade is matched with the inner side wall of the feeding cylinder, wherein a feeding hopper is disposed at the top of the feeding cylinder, and a feeding mechanism corresponding to the feeding hopper is disposed on one side of the processing box, wherein the feeding hopper is rotationally connected to a first rotating shaft and a second rotating shaft, wherein the first rotating shaft and the second rotating shaft are respectively sleeved with a crushing wheel, wherein one end of the first rotating shaft and one end of the second rotating shaft penetrate through the feeding hopper, and are respectively sleeved with a gear, wherein the two gears are engaged, wherein one side of the feeding hopper is fixedly connected to a second rotating motor, wherein an output end of the second rotating motor penetrates through the feeding hopper, and is fixedly connected to the first rotating shaft.

2. The device for separating the water from the sludge of claim 1, wherein the processing box is divided into a sludge cavity and a water purification cavity through a partition plate, wherein one side of the feeding cylinder is provided with a discharge hole, and a pipeline is fixedly connected in the discharge hole, wherein the lower end of the pipeline penetrates through the side wall of the sludge cavity, and extends into the sludge cavity, wherein a hydraulic cylinder is fixedly connected to the top of the sludge cavity, and an output end of the hydraulic cylinder is fixedly connected to a hydraulic rod, wherein the lower end of the hydraulic rod is fixedly connected to a squeezing plate, and the bottom of the squeezing plate is fixedly connected to a plurality of cutting blades that are arranged at equal intervals, wherein a bearing plate is disposed underneath the squeezing plate, and two ends of the bearing plate are respectively fixed to the inner side walls of the partition plate and the sludge cavity, wherein the side wall of the partition plate is fixedly connected to an electric telescopic rod, and an output end of the electric telescopic rod is fixedly connected to a push rod, wherein the push plate and the bearing plate are in a sliding connection, wherein a heating pipe is disposed underneath the bearing plate, and the heating pipe is fixedly connected to the inner walls of the partition plate and the sludge cavity, wherein a water through-hole is formed in the bottom of the feeding cylinder.

3. The device for separating the water from the sludge of claim 2, wherein a liquid inlet funnel corresponding to the water through-hole is fixedly connected to the top of the water purification cavity, wherein one side of the liquid inlet funnel penetrates through the top of the water purification cavity and extends inwards, and a porous plate is fixedly connected in the water purification cavity, wherein a filter screen is placed on the porous plate, and one end of the filter screen that is far away from the partition plate penetrates through the side wall of the purification cavity and extends outwards, wherein a support ring is fixedly connected to the outer wall of the purification cavity, and the support ring is in threaded connection with a threaded rod, wherein the lower end of the threaded rod penetrates through the filter screen, and is in threaded connection with the filter screen, wherein a moving mechanism is disposed at the bottom of the processing box.

4. The device for separating the water from the sludge of claim 3, wherein the moving mechanism comprises a fixing block that is fixedly connected to the bottom of the processing box, wherein a rolling wheel is disposed on one side of the fixing block that is far away from the processing box, wherein a rotating groove corresponding to the rolling wheel is formed in the fixing block, wherein the rolling wheel is rotationally connected to the inner side wall of the rotating groove through a fixing rod.

5. The device for separating the water from the sludge of claim 3, wherein a liquid outlet valve is disposed at the bottom of the water purification cavity.

6. The device for separating the water from the sludge of claim 2, wherein a discharge pipe is fixedly connected to the side wall of the sludge cavity, wherein the discharge pipe is in threaded connection with a discharge valve.

7. The device for separating the water from the sludge of claim 2, wherein an exhaust fan is fixedly connected to the top of the processing box, and an input end of the exhaust fan penetrates through the top of the processing box, and extends to the interior of the sludge cavity, wherein a heat dissipation hole corresponding to the exhaust fan is formed in the top of the sludge cavity.

8. The device for separating the water from the sludge of claim 1, wherein the feeding mechanism comprises a sludge pump that is fixedly connected to the side wall of the processing box, wherein the input end of the sludge pump is fixedly connected to a sludge pipeline, and the output end of the sludge pump is fixedly connected to a communicating pipe, wherein one end of the communicating pipe that is far away from the sludge pump extends towards the upper end of the feed hopper, wherein a sleeve ring is fixedly connected to the communicating pipe, wherein a connecting rod is fixedly connected to the processing box, and the connecting rod is connected to the sleeve ring through a telescopic bar.

\* \* \* \* \*